United States Patent Office 3,012,768
Patented Dec. 12, 1961

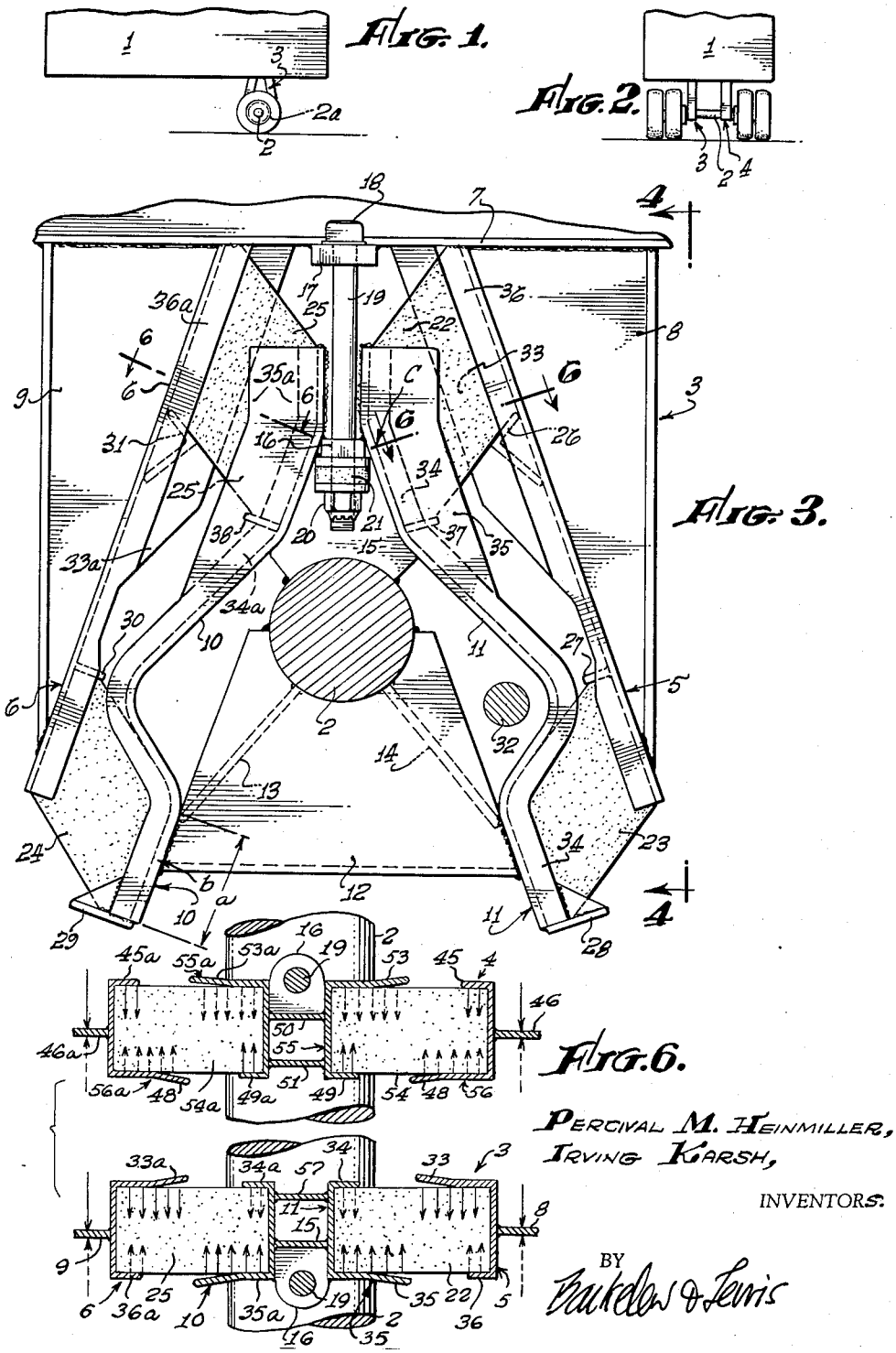

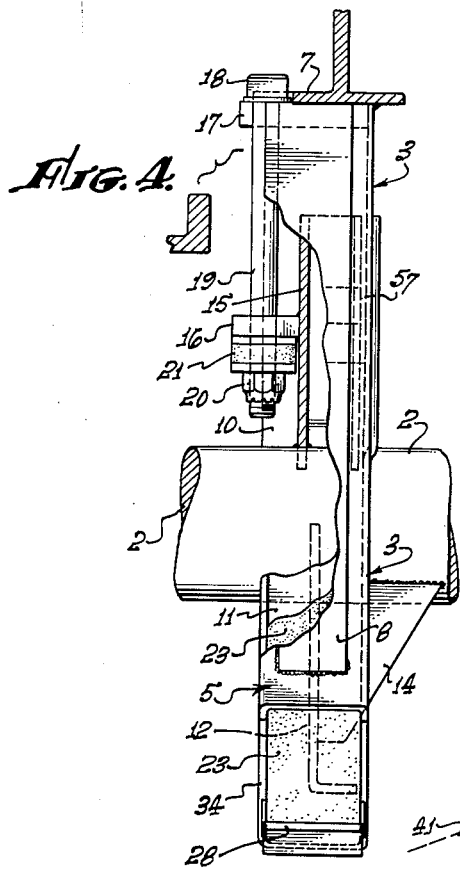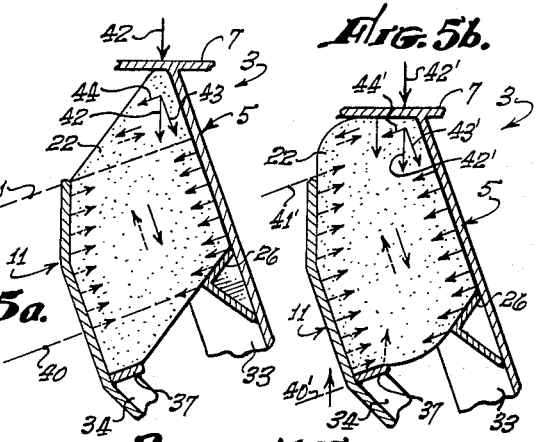

3,012,768
RUBBER VEHICLE SUSPENSION
Percival M. Heinmiller, Pasadena, and Irving Karsh, Los Angeles, Calif., assignors to Utility Trailer Manufacturing Company, Puente, Calif., a corporation of California
Filed Mar. 31, 1958, Ser. No. 724,967
18 Claims. (Cl. 267—63)

This invention relates to an improved resilient spring suspension system which is useful on trucks, trailers, automobiles, and other vehicles. The invention is, among other things, characterized by a novel suspension assembly having blocks of resilient material situated at substantially equal radial distance above and below the axle. The invention is also characterized by a novel transverse stabilizer having flanges adapted to bear transversely on the resilient blocks in such a way that right hand transverse axle forces cause compressive deformation of resilient blocks in one of the suspension assemblies, and left hand transverse axle forces cause compressive deformation of resilient blocks in the opposing suspension assembly. The invention is additionally characterized by a supporting structure for the resilient blocks which allows a small amount of creeping movement between the resilient block surface and the supporting surface, thereby dampening the rebound of the resilient blocks. The invention is further characterized by having resilient blocks of novel shape and transversely extending ledges above and below the blocks, which ledges are related to each other and to the blocks and to the flanges in such a manner that the compressive strains in the resilient material increase relative to the shear strains as the vehicle body moves downwardly relative to the axle. Because of these and other novel characteristics the invention has many advantages over suspension systems previously known in the art.

In the past design of vehicle suspension systems it has been customary to use torque elements to absorb axle torques due to braking or acceleration, which torque elements contributed little or nothing to the action of the system in response to vertical loads. One important advantage of this invention is that the vertical suspension elements are arranged to accommodate and oppose axle torques without the addition of torque members and without impairment of response to vertical or transverse loads.

In the past it has also been customary to use transverse stabilizing rods in suspension systems to secure the vehicle against undue sideways movement in response to transverse forces, which transverse stabilizing rods contributed little or nothing to the action of the system in response to vertical loads. Another important advantage of this invention is that the transverse stabilizer adapts the vertical suspension elements to cushion transverse forces and limit transverse movement in an extremely simple manner, without impairment of response to vertical or torque loads, and without the addition of stabilizing rods.

Also, in the past design of resilient spring suspension systems it has been customary to cement the resilient blocks to one of their associated rigid members to secure the blocks against undesired movement. A further important advantage to this invention is that by virtue of the transverse ledges above and below the resilient blocks and flanges at each side and the frictional forces due to the vertical load, the blocks are secured against undesired movement without being cemented to any member, thereby allowing a small amount of creeping movement between the resilient block surface and the supporting surfaces during the operation of the spring, without resulting in any permanent displacement of the resilient block. When the suspension system is displaced downwardly the blocks tend to creep downward along their supporting surfaces and when the downward force is removed the blocks creep back to their original relation with the supporting surface. This creeping action is a particularly important feature of the invention, because it damps the spring rebound, thus providing the invention with an inherent shock absorber action without the use of separate shock absorbers.

Also, in the past design of resilient spring suspension systems it has been customary to use several sets of vertical resilient springs in order to get an increase in the compressive strains in the resilient blocks relative to the shear strains as the vehicle body moved downward relative to the axle. This condition is desirable because resilient materials ordinarily have a larger movement per unit of shear strain than per unit of compressive strain, and for a smooth ride under light loads a large movement is desirable, while for a smooth ride under heavy loads a small movement is desirable. In the past this desired action has been achieved by providing resilient springs with differing amounts of compressive response per unit of vertical force, and adapting the system such that the springs with large compressive response per unit of vertical force are not called into action until the suspension system is heavily loaded. An additional important advantage of this invention is that by a novel shape of the resilient blocks and by a novel arrangement of transverse ledges above and below each block the desired action is attained in each individual block such that every resilient block in the system contributes equally to spring action under any load conditions.

In addition, due to the above mentioned and other novel aspects of the invention, a particularly improved action is obtained under conditions where relatively large torques, vertical forces, and transverse forces are acting on the suspension system at the same time; as, for example, when the vehicle is being turned and braked at the same time.

Other advantages of the invention will be apparent from the following description of one illustrative specific embodiment thereof, in connection with the attached drawings, in which:

FIG. 1 is a schematic side view of a trailer incorporating the invention;
FIG. 2 is a schematic rear view of the trailer;
FIG. 3 is an elevation view of the left hand suspension assembly as seen from the left in FIG. 2;
FIG. 4 is a rear view, in the direction indicated by line 4—4 on FIG. 3, of the left hand suspension assembly with portions cut away;
FIG. 5a is an elevational section of one of the resilient blocks under no load conditions, as seen from the left;
FIG. 5b is an elevational section of the block of FIG. 5a under full load conditions;
FIG. 6 is a plan section taken on the lines 6—6 of FIG. 3 disclosing a top view of the upper resilient blocks of both the right hand and left hand assemblies.

Broadly described, the invention comprises a novel suspension assembly which resists torque, a novel transverse stabilizer, and a novel combination of the two. The suspension assembly, as illustratively shown here, contains a first inverted V-assembly connected to the vehicle axle with base ends extending below the axle, a second inverted V-assembly connected to the sprung mass with legs outside of and approximately parallel with the legs of the first inverted V-assembly, and four blocks of resilient material interposed between the two inverted V-assemblies, two above and two below the axle. Transverse ledges are attached to the V-assemblies above and below the blocks, and the blocks are free to creep or slide relative to their supporting surfaces. The transverse stabilizer, which is used in combination with two suspension assemblies, comprises flanges attached to the inverted V-assemblies and bearing transversely on side surfaces of the resilient blocks in a manner which will be described in the detailed description. The blocks in the suspension assembly are preferably shaped such that their upper and lower surfaces make an acute angle with the horizontal which is greater than the complement of the acute angle between one leg of the inverted V-assemblies and the horizontal. Two such suspension assemblies are used in one particular embodiment of the invention, which is illustrated in FIGS. 1 and 2.

FIGS. 1 and 2 disclose a semi-trailer having wheels journaled to a transverse dead axle 2. Brakes acting to transmit torque between the wheels and axle are indicated at 2a. A left hand suspension assembly 3 and a right hand suspension assembly 4 are connected between the trailer body 1 and axle 2. The two suspension assemblies are substantially identical, except in relation to the transverse stabilizer; so for convenience only the left hand suspension assembly 3 will be described in detail.

Referring specifically to FIGS. 3 and 4, which disclose elevation views of suspension assembly 3; in FIG. 3 as seen from the left in FIG. 2, and, in FIG. 4, as seen from the rear (the right) in FIG. 3; the first inverted V-assembly comprises channel members 10 and 11 rigidly connected to the axle 2 by plates 12, 15, and 57, which are secured by welds. Plate 57 is not visible in FIG. 3, since it is parallel with and behind plate 15 in that figure. Gussets 13 and 14 are welded between plate 12 and axle 2 to provide transverse support for the assembly. Channel members 10 and 11 are bowed to provide clearance for other portions of the trailer structure, such as rod brake operating 32. A retaining bolt lug 16 is welded to channel members 10 and 11 near their upper ends to receive a retaining bolt 19 from the body of the vehicle. The retaining bolt, which acts to limit the downward movement of the axle relative to the body, bears upwardly on lug 16 through a nut 20 and a resilient washer assembly 21. The washer assembly contains a resilient washer spaced between two rigid washers. It acts to keep the retaining bolt from interfering with the springing action of the assembly during normal operation.

The second inverted V-assembly comprises channel members 5 and 6 rigidly connected to a frame member 7 by welds, and reinforced by gussets 8 and 9, which are welded to body beam 7 and to their respective channel members. A retaining bolt lug 17 is welded to beam 7 and the head 18 of retaining bolt 19 bears down on that lug. Beam 7 is rigidly connected to trailer body 1, or forms a part of its frame. The retaining bolt is slidable in either lug 16 or 17, or both, to allow downward movement of frame 7 relative to axle 2, but limits upward frame movement.

The resilient spring means comprise blocks 22, 23, 24, and 25 interposed between the two inverted V-assemblies as shown in FIG. 3, two above the axle, two below the axle, and all at substantially equal radial distance from the axle. The term radial distance as used in this document means the distance between the transverse center line of the axle and the transverse center line of the blocks; so that although blocks 22 and 25 appear to be nearer the axle, they are at substantially the same radial distances as that term is used herein. The purpose in placing the resilient blocks in the manner shown and described is to adapt the resilient blocks, which function primarily as vertical springs, to the secondary function of torque springs, without adding any specific torque elements to the system.

When a clockwise torque is applied to the axle 2 a clockwise force is transmitted through the lower supporting members to the bottom of channel 10 and a clockwise force is transmitted through the upper supporting members to the top of channel 11. The force on channel 10 is directed approximately normal to channel 6, and the force on channel 11 is directed substantially normal to channel 5. Therefore the two forces, which are approximately equal because of the substantially equal radial distance, cause a compressive deformation in blocks 24 and 22, thereby effectively absorbing the clockwise torque. A counterclockwise torque is absorbed in a similar manner by blocks 23 and 25 in response to counter-clockwise torques transmitted to the lower end of channel 11 and the upper end of channel 10. It should be noted at this point that there are two separate features of the invention disclosed in the torque absorption action, and that these two features need not be employed together in every embodiment of the invention. One feature is the placement of the resilient blocks above and below the axle so that they may be employed as torque absorbers, and the other feature is placement at approximately such radial distances that the torques will be distributed approximately equally between the upper and lower blocks. The upper and lower blocks, of equal thicknesses between the side flanges of the channels have pressure bearing surfaces on the channels that are indicated in FIG. 3. For example the extent, and consequently the area, of the bearing face of lower blocks 23, 24 on channels 11, 10, is indicated by the dimension $a$ in FIG. 3. The bearing area of the upper blocks on those channels, for example in block 33, extends from the top of channel 11 down to the ledge 37. The center of that bearing area is at the point indicated $c$ in that figure; the bearing center of lower block 24 being at $b$. The ratio of the radial distances of $c$ and $b$ from the axle center is about 1.65/2.55. The ratio of the pressure area at $b$ to that at $c$ is about 1.1/1.65. Those two ratios are approximately equal. Consequently, torque reaction of the blocks is centered on the axle and does not tend to move it longitudinally of the vehicle.

The action of the resilient blocks in response to vertical forces will be best understood by reference to FIGS. 5a and 5b, which show elevational sections of resilient block 22 and its associated supporting surfaces as seen in the aspect of FIG. 3. FIG. 5a shows the block under no or minimum load conditions. Suppose that a vertical downward force 42 is applied to the suspension assembly. The vertical force can be considered as composed effectively of two components, a component 43 acting parallel to channel member 5, and a component 44 acting normally to channel 5 and normally toward channel member 11. In the remainder of this discussion the force of component 43 will be called the angular component, and the force of component 44 will be called the normal component, and the total force 42 will be called the vertical force. According to the laws of mechanics, the total effect of the vertical force can be found by analyzing the effect of the angular and normal components taken together. In the preferred design as here shown, the angles of the essentially parallel channels with the vertical is approximately 20°. Force 43, parallel to the channels is consequently:

Cos 20°×vertical force 42 and force 44, normal to the channels is;

Sin 20°×vertical force 42. The ratio of force 44 to force 43 is then .3420/.9397=0.364.

The angular component 43 acts along the entire angular length of the block, and its effect on the block is to set up shear strains in the block of such magnitude as to develop a reacting force equal and opposite to the angular component. This reacting force is shown as the dotted angular vector in the middle of the block adjacent to the angular component of force, which is shown as the solid angular vector. In the remaining discussion, these shear strains set up by the angular component will be called angular shear strains.

The normal component 44 is effective only against that portion of the block which lies between its areas in contact with both channels; which, in FIG. 5a, is the region between lines 40 and 41. Thus the material in the block below line 40 and above line 41 is not affected directly by the normal component 44, although it is in angular shear from the effect of the angular component 43. The effect of the normal component between lines 40 and 41 is to set up compression strains in the volume between those lines. Therefore, in addition to angular shear strains caused by the angular shear component, the volume between lines 40 and 41 also is subject to compressive strains due to the normal component. In the remaining discussion these compressive strains will be called normal compressive strains.

Above line 41 the effect of the normal component is to set up shear strains as indicated by the vectors in FIG. 5a near the top of the block. In the remaining discussion the shear strains set up by the normal component above line 41 will be called normal shear strains.

Other normal shear strains are set up in the region below line 40 as a result of deformation of the block by the normal component of force 44. When the block is compressed by force 44, the resilient material moves into the regions above line 41 and below line 40. This movement causes a force to be exerted by the material on member 11 below line 40 and on member 5 above line 41. These two forces set up normal shear strains in the material opposite in direction to the normal shear strain indicated by the vectors above line 41. Vectors are not shown for the normal shear strains below line 40, but in general it may be said that they exist in both regions, and are directed opposite of the dotted vector shown in the upper region.

Then, in summary, the total effect of the load force 42 on the block 22 is to set up angular shear strains through the entire block, normal compressive strains in the volume of the block between the lines 40 and 41, normal shear strains in the volume of the block above line 41, and normal shear strains in the volume of the block below line 40. The relative amounts of compressive deformation as compared to shear deformation is determined by the relative size of the normal component of force as compared to the angular component of force, and by the volume of resilient material affected by the components.

When the suspension system is heavily loaded the spatial relationships change to the form shown in FIG. 5b. Channel 5 is moved straight downward and is moved normally toward channel 11 due to a large normal component of force, and block 22 is deformed into the shape shown by the strains set up due to the forces. In FIG. 5b an added load force is indicated at 42', the angular component at 43', and the normal component at 44'. Therefore, the block in FIG. 5b is assumed to be in loaded condition, and the discussion will concern the reaction of the system to an additional vertical force 42' which is equal to the force 42 described in the unloaded condition.

The added force 42' in the loaded condition will have the same angular and normal components as in the unloaded condition, because the angle of channel 5 has not changed. The shear effect of the added angular component in the loaded condition will be approximately the same as in the unloaded condition because the angular component is effective along the full length of the block, and the length of the block is substantially unchanged. The normal component of force is also equal in both conditions, but the effect of the doubled normal component is quite different in the loaded condition. The distance between lines 40' and 41' in the loaded condition is increased to nearly the full length of the block. Therefore, the amount of normal compressive deformation in the rubber is accordingly increased, while the amount of normal shear distortion in the rubber is decreased. In addition, plate 7 in the loaded condition bears directly on the rubber vertically above ledge 37, and since vertical reacting forces can be applied by ledge 37, as shown by the dotted vertical vector pointing upward from ledge 37, a portion of the block is also in vertical compression.

Thus it can be seen that as the body of the vehicle moves downward relative to the axle, volume of rubber under compressive strain increases and the total compressive strains in the resilient blocks increase relative to the shear strains, providing desirable riding characteristics under any load condition.

The vertical damping action of the invention is best illustrated by reference to FIGS. 5a and 5b. Under static loaded conditions the shear component of force 43 tends to move the surface of channel 5 downward relative to the surface of block 22 adjacent thereto; and to move the surface of block 22 adjacent to channel 11 downward relative thereto. However, in static loaded conditions the frictional resisting force developed by the normal component 44 is greater than the shear component, so that in static loaded conditions no creeping occurs between the surface of the block and the adjacent channel surfaces.

But in operation a good deal of vibration is applied to the system, and the effect of vibration allows creepage between the block surfaces and the adjacent channel members, the rubber blocks not being bonded to the channels. When a relatively large vertical load is applied to the assembly, as illustrated in FIG. 5b, creeping forces are developed between the block and its adjacent channel surfaces. While the block is being deformed, as shown, vibrations applied to the system allow an intermittent creeping movement of the block surfaces relative to the channel surfaces; an upward creep along the surface of channel 5 and a downward creep along the surface of channel 11. The creeping movement absorbs some of the energy of the downward movement due to frictional losses. When the downward force is released, the block rebounds toward the state shown in FIG. 5a, and during rebound creepage again occurs, but in the opposite direction of creepage during downward movement. The creepage during rebound restores the resilient surface to its original relation with the channel surfaces, and also absorbs a portion of the energy stored in the block during the downward movement. Thus the effect of surface creepage is to dampen the downward and upward movement of the system, thus providing a shock absorber action without use of specific shock absorber elements.

The action of the suspension system in response to transverse forces can be best explained by reference to FIG. 6, which discloses a plan section of the upper resilient blocks of both the left hand suspension assembly 3 and the right hand suspension assembly 4. Channel members 56 and 5, 56a and 6, are rigidly connected to the vehicle frame by their respective gussets 46, 46a and 8, 9. Channel members 11 and 55, 10 and 55a are rigidly connected to the axle 2 by their respective plates 15, 57, 51 and 50. Resilient blocks 22 and 54, 25 and 54a, are interposed between their respective channel members, as shown. Channel 11 has a long flange 35 bearing transversely on the outer surface of block 22 and a short flange 34 bearing transversely on the inner surface of block 22. Channel 55 has a long flange 53 bearing transversely on the outer surface of block 54 and a short flange 49 bearing transversely on the inner surface of block 54. Channel 56 has a long flange 48 bearing transversely on the inner surface of block 54, and a short flange 45 bearing on the outer surface of block 54. Channel 5 has a long flange 33 bearing transversely on the inner surface of block 22, and a short flange 36 bearing transversely on the outer surface of block 22.

The other channel members of the two suspension assemblies are similarly flanged. In FIG. 6, the flanges on channels 6, 10 and 56a and 55a, corresponding to those on the channels 5, 11, and 56, 55, are given the same numerals followed by the suffix "a."

When a force directed to the left, is applied from the body of the vehicle to the suspension, as indicated by the solid vectors pointing downward in FIG. 6, that force is communicated to the outer channels 5 and 6, 56 and 56a. From channels 5 and 6 that force is applied to the blocks 22 and 25 in the left hand assembly 3 by the long flanges 33 and 33a; and reacting compressive forces are developed by the long flanges 35 and 35a of the channels 11 and 10. These forces are indicated by the solid line vectors. Under these same forces toward the left, the long flanges of the right hand assembly 4 are inactive, the short flanges 45 and 45a applying force to blocks 54 and 54a, reacted only by forces developed by short flanges 49 and 49a of channels 55 and 55a, as indicated by the broken line vectors. The rubber blocks 22 and 25 of left hand assembly are thus subjected largely to transverse compressive strains, while the blocks 54, 54a, due to the wide spacing between the short flanges 45—49 and 45a—49a, are subjected mainly to shear rather than compression.

In response to forces directed to the right, on the body, as indicated by the large dotted vectors pointing upward in FIG. 6, the situation is reversed, placing the right hand blocks 54 and 54a under transverse compression while the left hand blocks 22 and 25 are placed under transverse shear. The block placed under transverse compression will act to stabilize the body of the vehicle under transverse forces and to cushion the effect of transverse forces. Therefore by this novel arrangement of flanges bearing transversely on the resilient blocks, as indicated and described, the resilient blocks are also utilized to act as a transverse spring system. It should be noted that the transverse spring action will not be affected by changing the relationship of flanges in both of the suspension assemblies, e.g. placing the long flanges of the axle channel members on the inside surface of their respective blocks and the long flanges of the body channel members on the outside of their respective blocks. If a change such as this were made, the right hand block would compress under left hand transverse forces on the body and the left hand block under right hand transverse forces on the body; but the effect in cushioning transverse forces would be the same.

However, it has been found that in the specific embodiment of the invention disclosed herein that the particular arrangement of flanges disclosed in FIG. 6 is preferable to the reverse arrangement. Transverse forces on the body of the vehicle are ordinarily encountered in turning the vehicle on a curve, and the forces arising from a turn also apply a relatively large downward force on the suspension units on the outside of the turn, and an equally large upward force on the suspension units inward of the turn. Therefore in a right hand turn the following forces are applied to the suspension units: a left hand transverse force applied on all suspension units, a downward force on the left hand suspension units 3, and an equal upward force on the right hand suspension units 4. With the arrangement of flanges disclosed in FIG. 6 the left hand transverse force shears blocks 54, 54a, which is relatively free of compressive strains due to its upward force, and compresses blocks 22 and 25, which is under relatively large compressive strains due to its downward force. Thus with the particular arrangement of flanges disclosed in FIG. 6 the forces developed by a turn cause a transverse compression in the block which is under relatively heavy vertical compression. At the same time the block at the opposite side is not laterally compressed and thus does not tend to lift that side of the body. Side sway in a turn is thereby minimized. It will be understood, of course, that it may be preferable to reverse the flange relationships in applications where side sway is not a critical factor. In addition to the action described above a transverse damping action due to creepage is developed during transverse movement in a manner similar to the vertical damping action described previously.

Although it is preferable that both forward and rear blocks in the two suspension assemblies 3 and 4 be laterally flanged in one or the other of the manners here described, to minimize lateral shift and preferably also to minimize lateral sway; yet that provision on all four blocks is not necessary to the described functions. For example, all the described functions are performed by the two blocks 22 and 54 shown in FIG. 6; or would be performed, for example by the flanged block 54 of FIG. 6 and the flanged block 25. And, in general, the described flanging at any one block resists side shift and sway in one lateral direction.

The specific embodiment of the invention described and illustrated herein is designed to provide a static vertical deflection of 2⅝" under an 18,000 pound axle load.

The resilient material employed is U.S. Rubber #5255 having a durometer hardness of 60. FIGS. 3 through 6 are drawn to scale from the actual structure of the embodiment, and the dimensions in FIGS. 3 through 6 may be converted to actual dimensions by taking the axle diameter to be 5". The various angles and dimensions disclosed therein have been found by experiment to be effective in this particular application of the invention.

However, it will be understood by those skilled in the art that it may be necessary to make changes in the specific character of the angles, dimensions, and materials to adapt the invention to vehicles other than the particular trailer disclosed herein. These changes cannot be specified exactly except in reference to a specific use of the invention; however it may be helpful to indicate some of the general reasons for the specific arrangement of parts disclosed herein.

The angle between the V-members determines the amount of vertical load to be borne by shear deformation of the rubber relative to the amount borne by compressive deformation of the rubber. Under compressive deformation rubber has great load carrying capacity while under shear it has great deflection capacity; therefore the choice of angle depends primarily on the maximum vertical load to be supported, and the amount of vertical deflection desired under full load. In this embodiment an angle between V-members of 40° was found appropriate for meeting the required conditions, i.e. a deflection of 2⅝" under a 9000 pound vertical load on each suspension assembly. With an angle of 40° approximately 60% of the vertical load is supported by compression, and the remaining 40% by shear.

The volume of the blocks and the area of the block supporting surfaces are chosen to give the proper ratio of load bearing surface area to peripheral (free) surface area to give the desired amount of normal movement under full load. The type of rubber used and the particular spacing between channels is chosen to give the desired amount of shear movement under full load. With an angle of 40° between V-members a shear deflection of 2.46 inches and a normal deflection of 0.9" were required.

The acute angles made by the top and bottom surfaces of the blocks with the horizontal are chosen in accordance with the amount of increase in compressive strains relative to shear strains desired per unit of downward vertical displacement. In general, these angles should be greater than the angle made by line 41 on FIG. 5a with the horizontal, i.e. greater than the complement of the acute angle made by channel 5 with the horizontal. The angle disclosed in FIG. 3 was found to provide the desired riding characteristics in this embodiment.

The surface area of the transverse flanges are chosen in accordance with the transverse load to be carried and the amount of transverse deflection desired under a full transverse load. The surface areas of the transverse ledges are chosen to give adequate support for the blocks, and to prevent permanent displacement of the blocks due to creeping, and to provide the appropriate enclosure for the blocks to increase compressive deformation under downward movement.

Thus it can be seen that many practical embodiments of the invention can be constructed, and it should be understood that the invention is not limited to the specific embodiment disclosed herein. The invention includes all embodiments which fall within the scope of the following claims.

We claim:

1. A suspension assembly for use in a vehicle having a front end, a rear end, a transverse wheel-supported element, and a sprung mass: said suspension assembly comprising in combination a first and a second rigid member attached to said element to form an unsprung V-assembly with the first member rearward of said element and the second member frontward of said element and the base end of both the first and second members extending below said element, a third and a fourth rigid member attached to said sprung mass to form a sprung V-assembly with the third member rearward of and approximately parallel with said first member and the fourth member frontward of and approximately parallel with said second member, a first block of resilient material between said first and third members above said element, a second block of resilient material between said first and third members below said element, a third block of resilient material between said second and fourth members above said element, and a fourth block of resilient material between said second and fourth members below said element, transverse ledges rigidly attached to the unsprung V-assembly below and in contact with a portion of the lower surface of each resilient block, transverse ledges rigidly attached to the sprung V-assembly above and in contact with a portion of the upper surface of each resilient block, and the surfaces of the resilient blocks in contact with the sprung and unsprung V-members being free to creep or slip relative to the adjacent surfaces of the sprung and unsprung V-members, said transverse ledges being adapted to prevent any permanent displacement of said resilient blocks relative to said sprung and unsprung V-members.

2. A suspension assembly as defined in claim 1 wherein the upper surface of said blocks of resilient material makes an acute angle with the horizontal plane which is greater than the complement of the acute angle between the horizontal plane and the leg of the sprung V-assembly in contact with each respective block, and the lower surface of said block of resilient material makes an acute angle with the horizontal plane which is greater than the complement of the acute angle between the horizontal plane and the leg of the sprung V-assembly in contact with each respective block.

3. A suspension system for use in a vehicle having a front end, a rear end, a transverse wheel-supported element, and a sprung mass: comprising in combination two suspension assemblies applied respectively to the right and left portions of said element, each such assembly comprising a first and a second rigid member attached to said element to form an unsprung V-assembly with the first member rearward of said element and the second member frontward of said element and the base end of both the first and second members extending below said element, a third and a fourth rigid member attached to said sprung mass to form a sprung V-assembly with the third member rearward of and approximately parallel with said first member and the fourth member frontward of and approximately parallel with said second member, a first block of resilient material between said first and third members above said element, a second block of resilient material between said first and third members below said element, a third block of resilient material between said second and fourth members above said element, and a fourth block of resilient material between said second and fourth members below said element; a first flange attached to the first member of the rightward suspension assembly and bearing transversely on the right hand surface of the first block of resilient material, a second flange attached to the third member of the rightward suspension assembly and bearing transversely on the left hand surface of the first block of resilient material, a third flange attached to the second member of the rightward suspension assembly and bearing transversely on the right hand surface of the third block of resilient material, a fourth flange attached to the fourth member of the rightward suspension assembly and bearing transversely on the left hand surface of the third block of resilient material, a fifth flange attached to the first member of the leftward suspension assembly and bearing transversely on the left hand surface of the first block of resilient material, a sixth flange attached to the third member of the leftward suspension assembly and bearing transversely on the right hand surface of the first block of resilient material, a seventh flange attached to the second member of the leftward suspension assembly and bearing transversely on the left hand surface of the third block of resilient material, and an eighth flange attached to the fourth member of the leftward suspension assembly and bearing transversely on the right hand surface of the third block of resilient material.

4. A suspension system as defined in claim 3 wherein both said right hand suspension assembly and said left hand suspension assembly have transverse ledges rigidly attached to the unsprung V-assembly below and in contact with a portion of the lower surface of each resilient block, and wherein transverse ledges are rigidly attached to the sprung V-assembly above and in contact with a portion of the upper surface of each resilient block, and wherein the surfaces of the resilient blocks in contact with the sprung and unsprung V-members are free to creep or slip relative to the adjacent surfaces of the sprung and unsprung V-members, and wherein said transverse ledges are adapted to prevent any permanent displacement of said resilient blocks relative to said sprung and unsprung V-members.

5. A suspension system as defined in claim 4 wherein the upper surface of said blocks of resilient material makes an acute angle with the horizontal plane which is greater than the complement of the acute angle between the horizontal plane and the leg of the sprung V-assembly in contact with each respective block, and the lower surface of said block of resilient material makes an acute angle with the horizontal plane which is greater than the complement of the acute angle between the horizontal plane and the leg of the sprung V-assembly in contact with each respective block.

6. A suspension assembly for use in a vehicle having a front end, a rear end, a transverse wheel-supported element, and a sprung mass: said suspension assembly comprising in combination a first and a second rigid member attached to said element to form an unsprung V-assembly with the first member directed rearward of said element and the second member directed frontward of said element, a third and a fourth rigid member attached to said sprung mass to form a sprung V-assembly with the third member rearward of and approximately parallel with said first member and the fourth member frontward of and approximately parallel with said second member, a first block of resilient material between said first and said third members, and a second block of resilient material between said second and said fourth members, transverse ledges rigidly attached to the unsprung V-assembly below and in contact with a portion of the lower surface of each resilient block, transverse ledges rigidly attached to the sprung V-assembly above and in contact with a portion of the upper surface of each resilient block, and the surfaces of the resilient blocks in contact with the sprung and unsprung V-members being free to creep or slip relative to the adjacent surfaces of the sprung and unsprung V-members, and said transverse ledges adapted to prevent any permanent displacement of said resilient blocks relative to said sprung and unsprung V-members.

7. A suspension assembly as defined in claim 6 wherein the upper surface of said blocks of resilient material makes an acute angle with the horizontal plane which is greater than the complement of the acute angle between the horizontal plane and the leg of the sprung V-assembly in contact with each respective block, and the lower surface of said block of resilient material makes an acute angle with the horizontal plane which is greater than the complement of the acute angle between the horizontal plane and the leg of the sprung V-assembly in contact with each respective block.

8. A suspension system for use in a vehicle having a front end, a rear end, a transverse wheel-supported element, and a sprung mass: said suspension system comprising in combination a suspension assembly as described in claim 6 attached to the rightward portion of said element, another suspension assembly as described in claim 6 attached to the leftward portion of said element, a first flange attached to the first member of the rightward suspension assembly and bearing transversely on the right hand surface of the first block of resilient material, a second flange attached to the third member of the rightward suspension assembly and bearing transversely on the left hand surface of the first block of resilient material, a third flange attached to the second member of the rightward suspension assembly and bearing transversely on the right hand surface of the second block of resilient material, a fourth flange attached to the fourth member of the rightward suspension assembly and bearing transversely on the left hand surface of the second block of resilient material, a fifth flange attached to the first member of the leftward suspension assembly and bearing transversely on the left hand surface of the first block of resilient material, a sixth flange attached to the third member of the leftward suspension assembly and bearing transversely on the right hand surface of the first block of resilient material, a seventh flange attached to the second member of the leftward suspension assembly and bearing transversely on the left hand surface of the second block of resilient material, and an eighth flange attached to the fourth member of the leftward suspension assembly and bearing transversely on the right hand surface of the second block of resilient material.

9. A suspension system as defined in claim 8 wherein the upper surfaces of said blocks of resilient material makes an acute angle with the horizontal plane which is greater than the complement of the acute angle between the horizontal plane and the leg of the sprung V-assembly in contact with each respective block, and the lower surface of said block of resilient material makes an acute angle with the horizontal plane which is greater than the complement of the acute angle between the horizontal plane and the leg of the sprung V-assembly in contact with each respective block.

10. A suspension assembly for use in a vehicle having a transverse wheel-supported element and a sprung mass; comprising in combination a first V-formation of two members on a substantially vertical axis attached to said element, a second V-formation of two members attached to the sprung mass with its members respectively spacedly opposed to the members of the first V-formation, blocks of rubber-like resilient material between the opposed members and bearing directly on surfaces fixed with relation thereto, block retaining ledges on the members of the V-formations including ledges on the members of the first V-formation under the lower ends of the resilient blocks and retaining ledges on the members of the second V-formation above the upper ends of the resilient blocks, and said blocks being unattached over their bearing surfaces on said members with regard to relative vertical movement and free to creep vertically with relation thereto on the surfaces on which they bear but restrain from bodily moving by said ledges.

11. The combination defined in claim 10 and in which the resilient blocks are of rhomboidal shape in the plane of the V-formations.

12. In a vehicle having a transverse wheel-supported element and a sprung mass; suspension means comprising in combination two suspension assemblies located in vertical longitudinal planes between the sprung mass and, respectively, the opposite end portions of said element, each of said suspension assemblies embodying a first V-formation of two members on a substantially vertical axis attached to the said element, a second V-formation of two members attached to the sprung mass with its members respectively spacedly opposed to the members of the first V-formation, blocks of resilient material between and bearing on the opposed members, lateral block confining flanges on at least each member of a pair of opposing members of the V-formations of each of the suspension assemblies, each such member having two confining flanges, one flange at the inner face and the other at the outer face of the associated block, the flange on the first V-formation member at one face of the block and the flange on the second V-formation member at the opposite face of the block being wider in a longitudinal direction and their edges approaching each other more closely in a longitudinal direction than the other flanges on said V-formation members.

13. The combination defined in claim 12 and including also block retaining ledges on the members of the V-formations including ledges on the members of the first V-formations under the lower ends of the resilient blocks and block retaining ledges on the members of the second V-formations above the upper ends of the resilient blocks, and said blocks being, except for said flanges and ledges, unattached over their bearing areas to said members and free to creep vertically with relation thereto.

14. A suspension assembly for use in a vehicle having a front end, a rear end, a transverse dead axle, a sprung mass, road wheels on the axle, and brakes adapted to apply wheel torque to the axle; comprising in combination a first V-formation of two members on a substantially vertical axis attached to the axle with one member forward of and the other member rearward of the axle, and both members extending above and below the axle, a second V-formation of two members attached to the sprung mass, said last named members being respectively spacedly opposed to the first named members and also extending above and below the axle, two separate blocks of rubber-like resilient material between each pair of opposed members with one block above the axle and the other below the axle, block retaining ledges on the members of the V-formations including ledges on the members of the first V-formation under the lower ends of the resilient blocks and retaining ledges on the members of the second V-formation above the upper ends of the resilient blocks, and block retaining ledges on the members of the second V-formation under the lower edges of at least some of the blocks, and said blocks being otherwise unattached to said members with regard to relative vertical movement and free to creep vertically with relation thereto on the surfaces on which they bear.

15. In a vehicle having a transverse wheel-supported element and a sprung mass; a suspension assembly comprising in combination a first V-formation of two members on a substantially vertical axis in a longitudinal plane attached to said transverse element, a second V-formation of two members attached to the sprung mass and lying in said longitudinal plane with its members respectively spacedly opposed to the members of the first V-formation, blocks of resilient material between the opposed members, at least the members of one pair of said opposed members having lateral block confining flanges, each such member having two confining flanges, one at one lateral face and the other at the opposite lateral face of the block, the flange on the first V-formation member at one face of the block and the flange on the second V-formation member at the opposite face of the block being wider in a longitudinal direction and their edges approaching each other more closely in a longitudinal direction than the other flanges on said V-formation members.

16. In a vehicle having a wheel supported element and a sprung mass; a suspension assembly comprising in combination a first V-formation of two members on a substantially vertical axis attached to said element, a second V-formation of two members attached to the sprung mass with its members respectively spacedly opposed to the members of the first V-formation, blocks of resilient material between the opposed members and having areas of bearing on them, said blocks being of general rhomboidal form in the plane of said members with the bearing areas on the members of the second V-formation extending higher than the bearing areas on the members of the first V-formation, and means on said members engaging the upper and lower end portions of the blocks to hold them against bodily displacement longitudinally of the members of the two V-formations, the blocks being otherwise unattached to said members over their bearing areas thereon and free to creep vertically with relation thereto.

17. The combination defined in claim 16 and in which the last mentioned means embodies ledges on the members of the first and second V-formations respectively below and above the blocks.

18. In a vehicle having a wheel supported element and a sprung mass; a suspension assembly comprising in combination a first V-formation of two members on a substantially vertical axis attached to said element, a second V-formation of two members attached to the sprung mass with its members respectively spacedly opposed to the members of the first V-formation, blocks of resilient material between the opposed members and having areas of bearing on them, and means on said members engaging the upper and lower end portions of the blocks to hold them against bodily displacement longitudinally of the members of the two V-formations, the blocks being otherwise unattached to said members over their bearing areas thereon and free to creep vertically with relation thereto.

References Cited in the file of this patent

UNITED STATES PATENTS

| | | |
|---|---|---|
| 1,534,362 | Davis | Apr. 21, 1925 |
| 2,211,462 | Hobson | Aug. 13, 1940 |
| 2,352,030 | Sprowl | June 20, 1944 |
| 2,704,664 | Hickman | Mar. 22, 1955 |
| 2,758,832 | Hickman | Aug. 14, 1956 |
| 2,783,959 | Boschi | Mar. 5, 1957 |
| 2,802,662 | Hirst | Aug. 13, 1957 |

FOREIGN PATENTS

| | | |
|---|---|---|
| 909,533 | Germany | Apr. 22, 1954 |